(12) United States Patent
Itakura

(10) Patent No.: US 10,310,488 B2
(45) Date of Patent: Jun. 4, 2019

(54) NUMERICAL CONTROLLER HAVING PROGRAM CORRECTION ASSISTANCE FUNCTION FOR ALARM SOLUTION

(71) Applicant: FANUC CORPORATION, Minamitsuru-gun, Yamanashi (JP)

(72) Inventor: Shinichirou Itakura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 187 days.

(21) Appl. No.: 15/605,338

(22) Filed: May 25, 2017

(65) Prior Publication Data
US 2017/0343989 A1    Nov. 30, 2017

(30) Foreign Application Priority Data

May 26, 2016   (JP) .................................. 2016-105492

(51) Int. Cl.
G05B 19/41    (2006.01)
G06F 11/22    (2006.01)
G05B 19/4155   (2006.01)
G05B 19/406   (2006.01)

(52) U.S. Cl.
CPC ....... *G05B 19/4155* (2013.01); *G05B 19/406* (2013.01); *G05B 2219/35293* (2013.01); *G05B 2219/49069* (2013.01)

(58) Field of Classification Search
CPC .............. G05B 19/4155; G05B 19/406; G05B 2219/35293; G05B 2219/49069; G06F 11/0766; G06F 11/22

USPC ......................................... 700/159, 173, 174
See application file for complete search history.

(56) References Cited

U.S. PATENT DOCUMENTS

| | | | |
|---|---|---|---|
| 2007/0088454 A1* | 4/2007 | Jalluri ................ | G05B 19/4065 700/159 |
| 2010/0114359 A1* | 5/2010 | Kommareddy .... | G05B 19/4093 700/173 |
| 2016/0026169 A1 | 1/2016 | Sasaki | |
| 2017/0060116 A1* | 3/2017 | Liao ..................... | G05B 19/402 |

FOREIGN PATENT DOCUMENTS

| | | |
|---|---|---|
| JP | H0371209 A | 3/1991 |
| JP | 2005-031981 A | 2/2005 |
| JP | 2016024662 A | 2/2016 |

OTHER PUBLICATIONS

Notice of Grounds for Rejection for Japanese Application No. 2016-105492, dated Sep. 25, 2018, with translation, 4 pages.

* cited by examiner

*Primary Examiner* — Michael J Brown
(74) *Attorney, Agent, or Firm* — RatnerPrestia

(57) ABSTRACT

A numerical controller sequentially reads blocks contained in a machining program, analyzes the read blocks to identify a block that causes an alarm based on mismatch criterion information stored in advance, and generates alarm cause data. The numerical controller then generates, based on the generated alarm cause data, at least one set of proposal patch data for correcting the machining program in such a way that the cause of the alarm is solved and generates a corrected machining program that is the machining program to which the generated proposal patch data is applied.

3 Claims, 6 Drawing Sheets

FIG. 4A

INTER-FUNCTION MISMATCH TABLE

| | NANO-SMOOTHING | TOOL LENGTH COMPENSATION | TOOL RADIUS COMPENSATION | CANCEL TOOL RADIUS COMPENSATION | TOOL CENTER POINT CONTROL | TOOL POSITION OFFSET | CIRCULAR INTERPOLATION | ... |
|---|---|---|---|---|---|---|---|---|
| NANO-SMOOTHING | — | NG | OK | OK | NG | OK | OK | ... |
| TOOL LENGTH COMPENSATION | OK | — | OK | OK | NG | NG | OK | ... |
| TOOL RADIUS COMPENSATION | OK | OK | — | OK | NG | NG | OK | ... |
| CANCEL TOOL RADIUS COMPENSATION | OK | OK | OK | — | OK | OK | OK | ... |
| TOOL CENTER POINT CONTROL | NG | OK | NG | OK | — | OK | OK | ... |
| TOOL POSITION OFFSET | OK | OK | NG | OK | OK | — | OK | ... |
| CIRCULAR INTERPOLATION | OK | OK | NG | NG | OK | OK | — | ... 211 |
| ... | ... | ... | ... | ... | ... | ... | ... | ... |

FIG. 4B

ENVIRONMENTAL MISMATCH TABLE

212

| | USABLE/UNUSABLE |
|---|---|
| NANO-SMOOTHING | OK |
| TOOL LENGTH COMPENSATION | OK |
| TOOL RADIUS COMPENSATION | OK |
| CANCEL TOOL RADIUS COMPENSATION | OK |
| TOOL CENTER POINT CONTROL | NG |
| TOOL POSITION OFFSET | OK |
| CIRCULAR INTERPOLATION | OK |
| ⋮ | ⋮ |

FIG. 5

FIRST EXAMPLE OF ALARM CAUSE DATA

- TOOL LENGTH COMPENSATION FUNCTION CANNOT BE EXECUTED DURING EXECUTION OF NANO-SMOOTHING FUNCTION
  - NANO-SMOOTHING FUNCTION IS EXECUTED IN BLOCKS i TO k
  - TOOL LENGTH COMPENSATION IS PERFORMED IN BLOCK j
  - BLOCK i < BLOCK j < BLOCK k

SECOND EXAMPLE OF ALARM CAUSE DATA

- TOOL RADIUS COMPENSATION FUNCTION CANNOT BE EXECUTED DURING EXECUTION OF CIRCULAR INTERPOLATION FUNCTION
  - CIRCULAR INTERPOLATION FUNCTION IS EXECUTED IN BLOCKS i TO m
  - TOOL RADIUS COMPENSATION FUNCTION IS EXECUTED IN BLOCKS j TO l
  - BLOCK i < BLOCK j < BLOCK l < BLOCK m

- TOOL POSITION OFFSET FUNCTION CANNOT BE EXECUTED DURING EXECUTION OF TOOL RADIUS COMPENSATION FUNCTION
  - TOOL RADIUS COMPENSATION FUNCTION IS EXECUTED IN BLOCKS j TO l
  - TOOL POSITION OFFSET FUNCTION IS EXECUTED IN BLOCK k
  - BLOCK j < BLOCK k < BLOCK l

THIRD EXAMPLE OF ALARM CAUSE DATA

- TOOL CENTER POINT CONTROL FUNCTION CANNOT BE EXECUTED IN CURRENT ENVIRONMENT
  - TOOL CENTER POINT CONTROL FUNCTION IS EXECUTED IN BLOCK n

FIG. 6

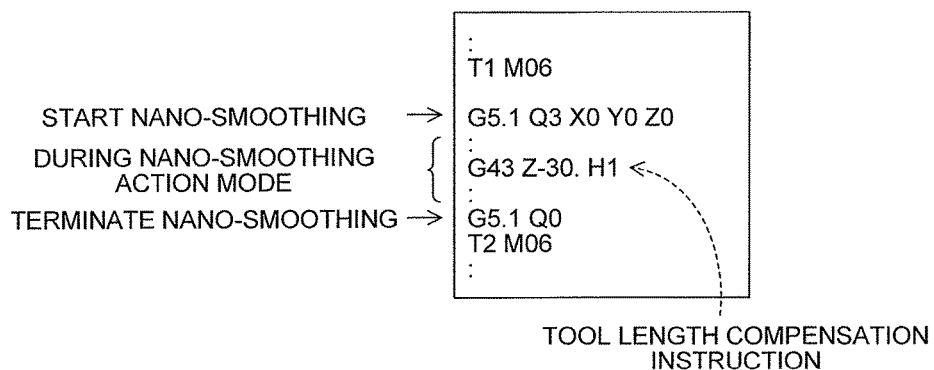

NUMERICAL CONTROLLER HAVING PROGRAM CORRECTION ASSISTANCE FUNCTION FOR ALARM SOLUTION

BACKGROUND OF THE INVENTION

1. Field of the Invention

The present invention relates to a numerical controller, and particularly to a numerical controller having a program correction assistance function for alarm solution.

2. Description of the Related Art

A machining program used in a numerical controller is created for instructing movement along each axis of a machine under control, activation of an auxiliary function, and other purposes and written in accordance with a grammatical rule defined by the specifications of the numerical controller. The machining program is created by an operator who has knowledge of control of the machine, but it is difficult even for an operator having sufficient knowledge to create a machining program with absolutely no error.

Errors of a machining program include an error based on a mismatch, such as an error based on an inter-function mismatch and an error based on a functional mismatch in the numerical controller or the machine. A mismatch-based error occurs, for example, when a plurality of functions compete with each other in the machining program being executed (see Japanese Patent Application Laid-Open No. 2005-031981, for example) or when the machining program being executed instructs a function that could not be used in the environment of the numerical controller, which is the environment in which the machining program operates, or in the environment of the machine under control. An error based on an inter-function mismatch occurs, for example, in a case where a tool length compensation instruction is issued during a nano-smoothing action mode, as shown in FIG. 6. The numerical controller, when it executes the machining program shown in FIG. 6, notifies an operator of an alarm during the execution of the machining program.

The operator who was notified of the alarm from the numerical controller reads a message accompanying the alarm, refers to a manual or the like of the numerical controller, recognizes that the content of the alarm is an error based on a mismatch, and analyzes the machining program so as to solve the alarm. The machining program to be analyzed, however, is formed of several thousand blocks in some cases, and machining program analysis for solving one alarm undesirably requires enormous efforts.

SUMMARY OF THE INVENTION

An object of the present invention is to provide a numerical controller capable of reducing efforts required to solve an alarm that occurs due to a mismatch-related error.

A numerical controller according to the present invention controls a machine based on a machining program and includes a mismatch criterion information storage section that stores mismatch criterion information that serves as criteria used to determine a block that causes an alarm to be issued when the machining program is executed, a program analyzing section that sequentially reads blocks contained in the machining program, analyzes the read blocks to identify the block that causes the alarm based on the mismatch criterion information stored in the mismatch criterion information storage section, and generates alarm cause data, a program proposing section that generates, based on the alarm cause data, at least one set of proposal patch data for correcting the machining program in such a way that the cause of the alarm is solved, and a program applying section that generates a corrected machining program that is the machining program to which the proposal patch data is applied.

The alarm cause data may contain information representing a type of alarm and information on a machining program block relating to the alarm, and the program proposing section may be configured to determine a method for correcting the machining program based on the information representing a type of alarm and further determine a location where the machining program is corrected based on the information on a machining program block relating to the alarm.

The program proposing section may display a screen that allows selection of any of the proposal patch data sets on a display section provided in the numerical controller, and the program applying section may be configured to apply the proposal patch data selected on the selection screen to the machining program.

The present invention allows significant reduction in an operator's efforts required for analysis of a cause of an alarm issued by an error based on a mismatch and correction of a machining program for solution of the alarm.

BRIEF DESCRIPTION OF THE DRAWINGS

FIGS. 4A and 4B describe mismatch criterion information;

FIG. 5 describes alarm cause data; and

FIG. 6 describes an alarm issued due to a mismatch in a machining program.

DETAILED DESCRIPTION OF THE PREFERRED EMBODIMENTS

A numerical controller according to the present invention has the function of presenting a machining program correction proposal effective in solving an alarm issued due to an error based on an inter-function mismatch, an error based on a functional mismatch in the numerical controller or a machine, or any other errors during execution of a machining program and automatically correcting the machining program when the presented correction proposal is approved by an operator.

Figure 1:
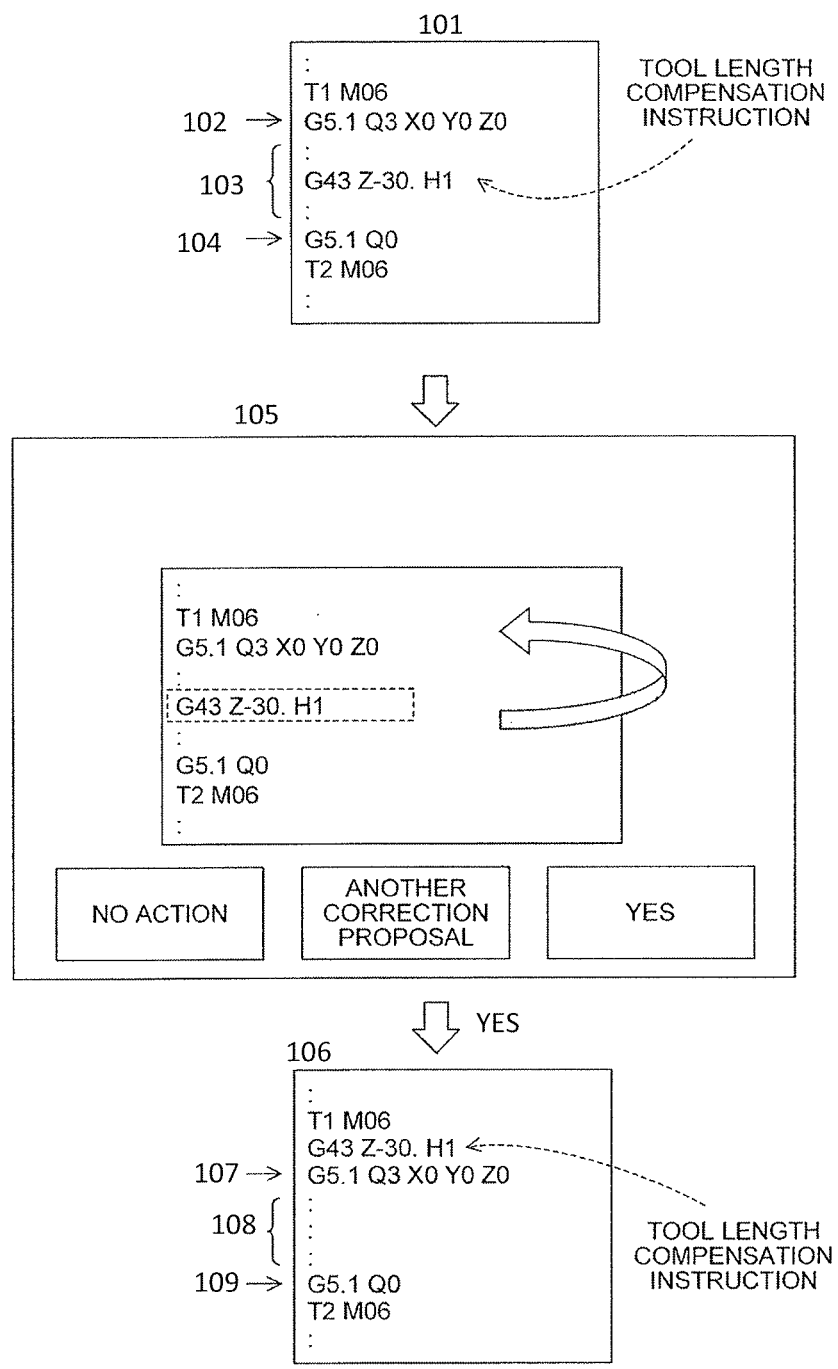
FIG. 1 describes an overview of a program correction assistance function for alarm solution according to the present invention.

FIG. 1 shows an example of operation of correcting a program that issues an alarm in a numerical controller according to the present invention.

The numerical controller according to the present invention notifies, when it executes a machining program that instructs tool length compensation during a nano-smoothing action mode, an operator during the execution of the machining program that the operator cannot instructs a tool length during the nano-smoothing and proposes a machining program correction proposal that solves the issued alarm, as shown in FIG. 1. When the operator approves the proposed correction proposal, the numerical controller applies the correction proposal to the machining program to create a corrected machining program.

FIG. 1 shows program 101, dialog 105 and program 106. Program 101 issues an alarm, and has three sections. Section 102 starts nano-smoothing, section 103 is an action mode during nano-smoothing, and section 104 terminates nano-smoothing. Dialog 105 shows that the tool length instruction cannot be issued during nano-smoothing, and questions whether to move to a position before the start of nano-smoothing. Three options are provided for continuing. When "yes" is selected, program 106 is generated. Similar to program 101, program 106 also has three sections. Section 107 starts nano-smoothing, section 108 is an action mode during nano-smoothing, and section 109 terminates nano-smoothing.

The following description will be made of the machining program correction proposal described above and the configuration of the numerical controller having the function of applying the correction proposal.

Figure 2:
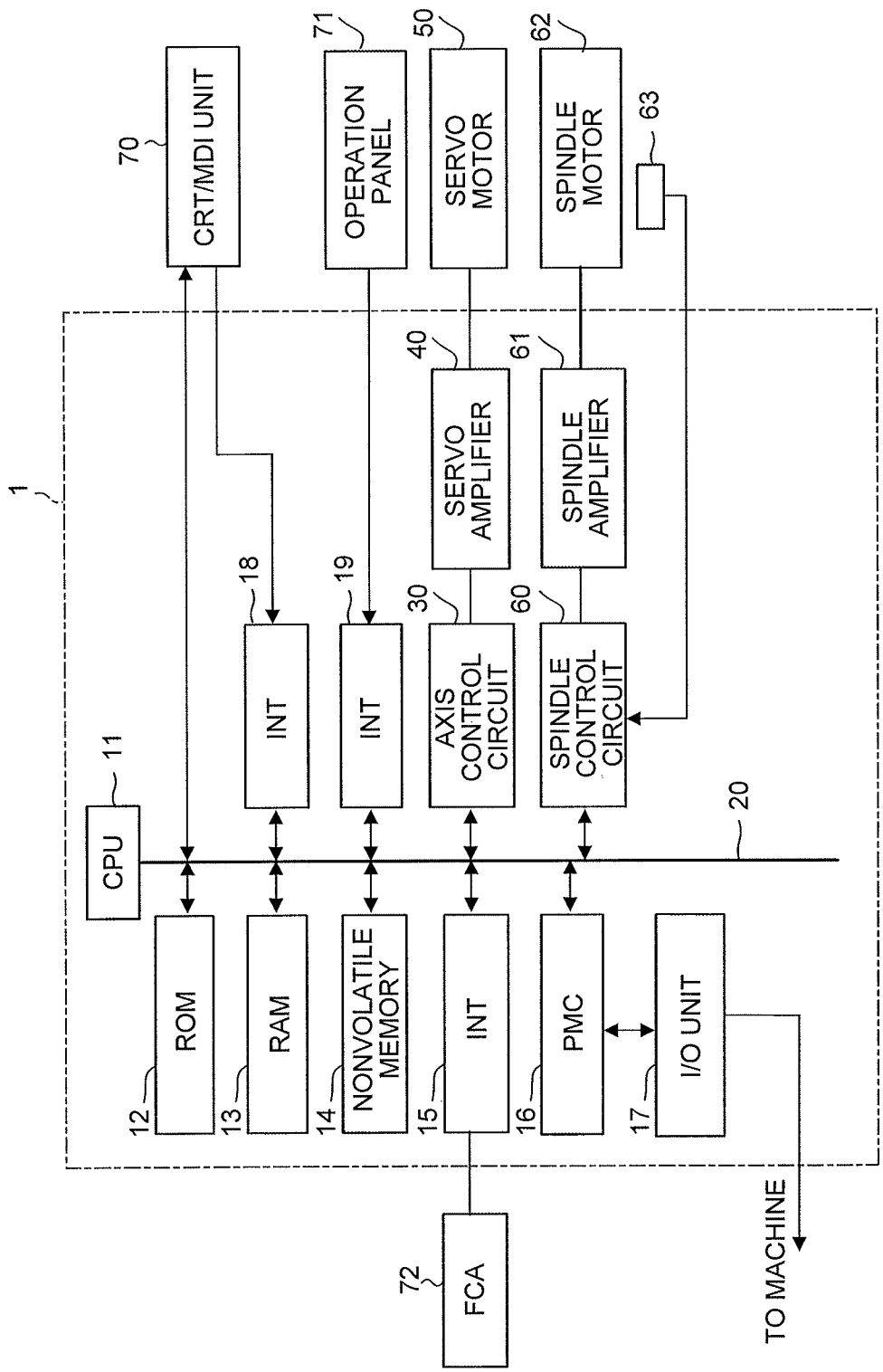
FIG. 2 is hardware configuration diagram showing key parts of a numerical controller according to an embodiment of the present invention.

FIG. 2 is a hardware configuration diagram showing key parts of a numerical controller according to an embodiment of the present invention and a machine tool controlled by the numerical controller.

A CPU 11 provided in a numerical controller 1 is a processor that controls the entire numerical controller 1. The CPU 11 reads a system program stored in a ROM 12 via a bus 20 and controls the entire numerical controller 1 in accordance with the system program. A RAM 13 stores temporary calculation data and display data, a variety of data inputted by an operator via a CRT/MDI unit 70, and other types of data.

A nonvolatile memory 14 is configured as a memory that is protected, for example, by a battery that is not shown so that the storage state of the memory is maintained even when the numerical controller 1 is powered off. The nonvolatile memory 14 stores a machining program that is read via an interface 15 and will be described later and a machining program inputted via the CRT/MDI unit 70. The nonvolatile memory 14 further stores a machining program operating program used to operate the machining program, a program for analyzing the machining program and creating and applying a correction proposal, and other programs, and these programs are developed in the RAM 13 when executed. Further, a variety of system programs for carrying out, for example, an editing mode process necessary for creation and editing of the machining program are written into the ROM 12 in advance. A variety of machining programs, such as the machining program executed by the numerical controller according to the present invention, can be inputted via an interface 15 or the CRT/MDI unit 70 and stored in the nonvolatile memory 14.

The interface 15 is an interface that connects the numerical controller 1 to an external apparatus 72, such as an adaptor. A machining program, a variety of parameters, and other pieces of information are read from the external apparatus 72. The machining program edited in the numerical controller 1 can be stored in external storage means via the external apparatus 72. A programmable machine controller (PMC) 16 outputs a signal to a peripheral apparatus (for example, actuator, such as robot hand for tool exchange) of a machine tool via an I/O unit 17 in accordance with a sequence program built in the numerical controller 1 to control the peripheral apparatus. The programmable machine controller 16 further receives a signal from any of a variety of switches and other components on an operation panel installed on a main body of the machine tool, performs necessary signal processing, and then passes the processed signal to the CPU 11.

The CRT/MDI unit 70 is a manual data input device including a display, a keyboard, and other components, and an interface 18 receives an instruction and data via the keyboard of the CRT/MDI unit 70 and passes the instruction and data to the CPU 11. An interface 19 is connected to an operation panel 71 including a manual pulse generator and other components.

An axis control circuit 30 for controlling the axes of the machine tool receives an instructed amount of movement along an axis from the CPU 11, and outputs the movement instruction to a servo amplifier 40. The servo amplifier 40 receives the movement instruction and drives a serve motor 50, which moves the axes of the machine tool. The servo motor 50, which drives the axes, has a built-in position/speed detector and feeds back a position/speed feedback signal from the position/speed detector to the axis control circuit 30 for position/speed feedback control. Although the block diagram of FIG. 2 only shows one axis control circuit 30, one serve amplifier 40, and one serve motor 50, they are provided for each of the axes of the machine tool in practice. Further, the position/speed feedback from the servo motor 50 is omitted in FIG. 2.

A spindle control circuit 60 receives a spindle rotation instruction issued to the machine tool and outputs a spindle speed signal to a spindle amplifier 61. The spindle amplifier 61 receives the spindle speed signal and rotates the shaft of a spindle motor 62 of the machine tool at the instructed speed of rotation to drive a tool or a workpiece under machining.

A position coder 63 is coupled with the spindle motor 62 via a gear, a belt, or any other component. The position coder 63 outputs feedback pulses in synchronization with the rotation of the spindle, and the feedback pulses are read by the CPU 11.

Figure 3:
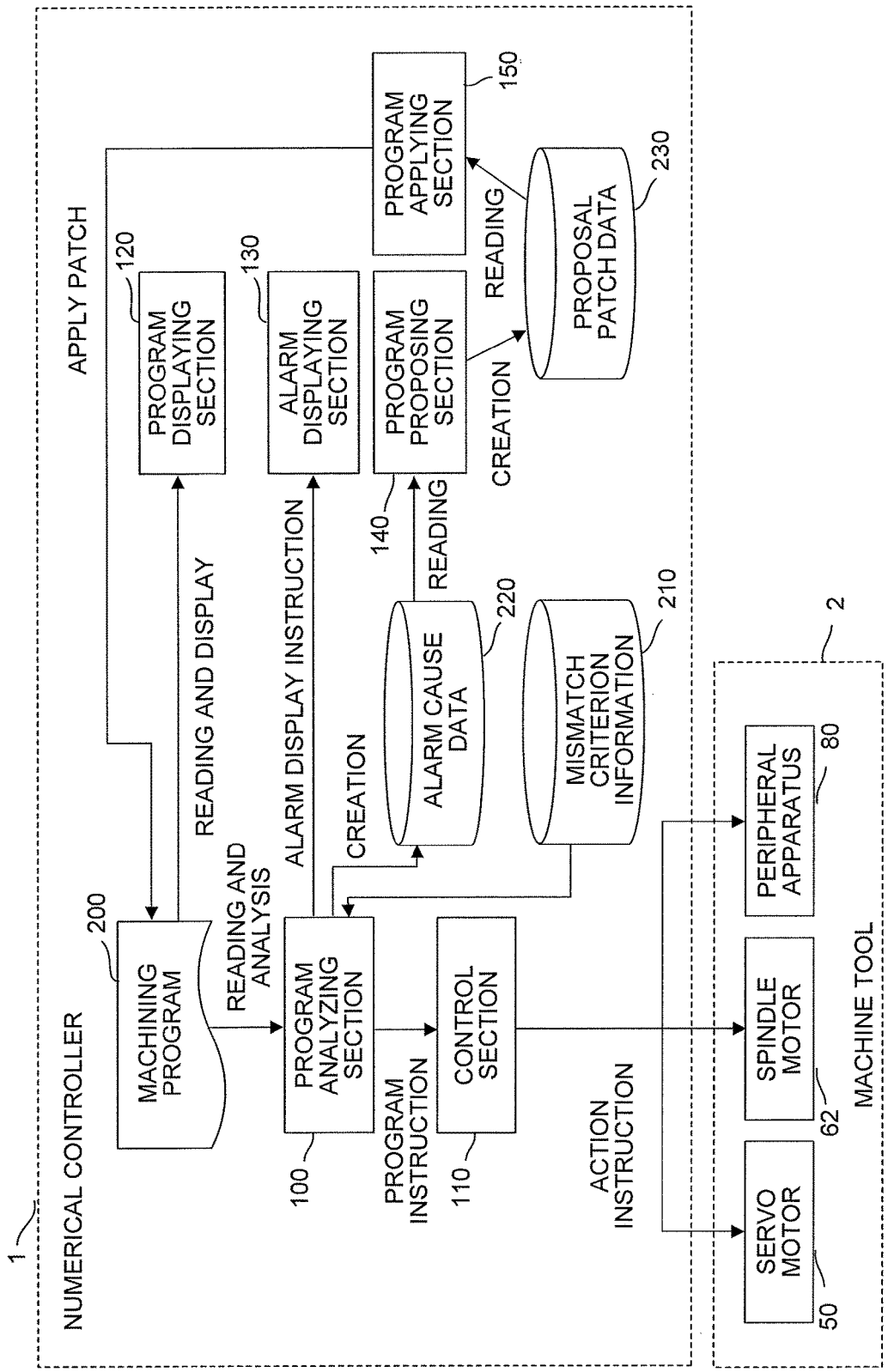
FIG. 3 is a schematic functional block diagram of the numerical controller according to the embodiment of the present invention.

FIG. 3 is a schematic functional block diagram in a case where the means described above are implemented as the system program in the numerical controller 1 shown in FIG. 2.

Each functional means shown in FIG. 3 is achieved when the CPU 11 shown in FIG. 2 executes the system program to provide the functions of the functional means. The numerical controller 1 according to the present embodiment includes a program analyzing section 100, a control section 110, a program displaying section 120, an alarm displaying section 130, a program proposing section 140, and a program applying section 150.

The program analyzing section 100 sequentially reads blocks that instruct action of the machine tool under control from a machining program 200 stored in the nonvolatile memory 14 (not shown), analyzes each of the read blocks, and outputs a program instruction according to the content of the block on the basis of a result of the analysis to the control section 110. The control section 110 issues actual action instructions to the servo motor 50, the spindle motor 62, and a peripheral apparatus 80 provided in a machine tool 2 on the basis of the program instruction received from the program analyzing section 100 to control the machine tool 2 to cause it to act as written in the machining program 200. When the machining program 200 is executed, the program displaying section 120 reads the machining program 200 and displays the content of the machining program on a display device provided in the CRT/MDI unit 70 (not shown).

The program analyzing section 100, when it analyzes the blocks contained in the machining program 200, refers to a mismatch criterion information storage section 210 and determines whether or not the machining program 200 contains an error based on a mismatch (such as error based on inter-function mismatch and error based on functional mismatch in numerical controller or machine). When a block that issues a mismatch producing instruction is present in the machining program 200, the program analyzing section 100 outputs an alarm display instruction to the alarm displaying section 130, analyzes the machining program 200, creates alarm cause data, which will be described later, and stores the created alarm cause data in an alarm cause data storage section 220. The alarm displaying section 130 displays an alarm on the display device provided in the CRT/MDI unit 70 (FIG. 2) in accordance with the alarm display instruction received from the program analyzing section 100.

FIGS. 4A and 4B show an example of mismatch criterion information stored in the mismatch criterion information storage section 210.

The mismatch criterion information storage section 210 stores information on mismatches that each cause an alarm that occurs when the machining program is executed, such as an inter-function mismatch table 211 (FIG. 4A), which registers information on inter-function mismatches (as to whether or not two functions can be simultaneously used), and an environmental mismatch table 212 (FIG. 4B), which registers information on functional mismatches in the environments of the numerical controller, the machine tool, and other apparatuses (as to whether or not a function can be used in a specific environment).

The inter-function mismatch table 211 can be defined as a table that specifies, as a row item, a function having already been activated, specifies, as a column item, a function to be activated later, and specifies matching (OK) or mismatching (NG) in the position where the row and the column intersect each other, as shown in FIG. 4A. The inter-function mismatch table 211 in FIG. 4 shows, for example, that during execution of a nano-smoothing function having first been activated (during nano-smoothing control), execution of tool length compensation or tool tip control causes mismatching, whereas during execution of the tool length compensation having first been activated (during tool length compensation is in effect), no mismatch occurs even when the nano-smoothing function is activated.

The inter-function mismatches specified in the inter-function mismatch table 211 shown in FIG. 4A are presented by way of example, and a variety of other mismatches are present other than those shown in the inter-function mismatch table 211, for example, a mismatch between an inclining surface indexing function and a workpiece placement error compensation function. Information on the inter-function mismatches may be provided by the manufacturers of the numerical controller and the machine when they are shipped, or the inter-function mismatch table 211 may be so configured as to be correctable by the operator or a person in charge of maintenance who works for the manufacturer even after the shipment, for example, when a new function is added or an existing function is corrected.

The environmental mismatch table 212 can be defined as a table that specifies an instructable function as a row item and further specifies the function is usable (OK) or unusable (NG), as shown in FIG. 4B. The example of the environmental mismatch table 212 shown in FIG. 4B shows that the nano-smoothing function is usable but the tool center point control function is unusable in the current numerical controller environment.

The environment mismatches of the functions specified in the environmental mismatch table 212 shown in FIG. 4B are presented by way of example and change in accordance with the type of the numerical controller and the machine under control. Information on the environmental mismatching of these functions may be provided by the manufacturers of the numerical controller and the machine when they are shipped, or the environmental mismatch table 212 may be so configured as to be correctable by the operator or a person in charge of maintenance who works for the manufacturer even after the shipment, for example, when a new function is added, an existing function is corrected, or the machine under control is changed.

The program analyzing section 100, for example, refers to the inter-function mismatch table 211 and determines whether or not a mismatch occurs between functions simultaneously used by the machining program 200. The program analyzing section 100, when it determines that a mismatch occurs, issues an alarm. Further, the program analyzing section 100, for example, refers to the environmental mismatch table 212 and determines whether or not a function used by the machining program 200 can be used with the numerical controller 1 or the machine tool 2, which provides an environment in which the function is executed. When the function is not usable and a mismatch occurs, the program analyzing section 100 issues an alarm.

FIG. 5 shows an example of the alarm cause data created by the program analyzing section 100.

The alarm cause data contains information representing the type of issued alarm (type of mismatch) and information on a machining program block relating to the alarm. For example, in a first example of the alarm cause data shown in FIG. 5, the information representing the type of alarm is "tool length compensation function cannot be executed during execution of nano-smoothing function," and the information on a machining program block relating to the alarm is "nano-smoothing function is executed in blocks having block numbers i to k," "tool length compensation function is executed in block having block number j," and "block number i<block number j<block number k."

In a second example of the alarm cause data shown in FIG. 5, two sets of alarm cause data are created. The information representing the type of alarm is "tool radius compensation function cannot be executed during execution of circular interpolation function" and "tool position offset function cannot be executed during execution of tool radius compensation function," and the information on a machining program block relating to the alarm is "circular interpolation function is executed in blocks having block numbers i to m," "tool radius compensation function is executed in blocks having block numbers j to l," "block number i<block number j<block number l<block number m," "tool radius compensation function is executed in blocks having block numbers j to l," "tool position offset function is executed in block having block number k," and "block number j<block number k<block number l."

Further, in a third example of the alarm cause data shown in FIG. 5, the information representing the type of alarm is "tool center point control function cannot be executed in current environment," and the information on a machining program block relating to the alarm is "tool center point control function is executed in block having block number n."

When an alarm is issued, the program analyzing section 100 identifies the cause of the issued alarm on the basis of the mismatch criterion information stored in the mismatch criterion information storage section 210, further searches or otherwise check the machining program 200 to extract the block number of the block where the function relating to the cause of the alarm starts and the block number of the block where the function ends (in the case of a function executed over a certain range) or the block number of the block where the function relating to the cause of the alarm is executed (in the case of a function executed and completed in one block), information on the order of the block numbers, and other pieces of information, and generates alarm cause data on the basis of the extracted information.

Referring back to FIG. 3, the program proposing section 140 reads the alarm cause data stored in the alarm cause data storage section 220, creates one, two, or a greater number of sets of proposal patch data that can solve an alarm on the basis of the read alarm cause data, and stores the created proposal patch data in a proposal patch data storage section 230. The proposal patch data created by the program proposing section 140 is so displayed along with the alarm cause via the CRT/MDI unit 70 (FIG. 2) as to be viewed by the operator. A screen so displayed as to be viewed by the operator allows the operator's input representing which proposal patch data the operator approves among the displayed sets of proposal patch data or the operator approves none of the displayed sets of proposal patch data.

The proposal patch data created by the program proposing section 140 is data (movement and deletion of block, addition of block, and combination thereof) for proposing a machining program correction patch that solves an inter-function mismatch or an environmental mismatch on the basis of the information representing the type of alarm and the information on a machining program block indicated by the alarm cause data created on the basis of mismatches that occur in the machining program.

The program proposing section 140, when it creates correction patch data for solving an inter-function mismatch, acquires the relationship between functions that cause an mismatch from the information representing the type of alarm, determines a correction method, such as determination of a block relating to a function to be corrected, and further determines the location where the machining program is corrected on the basis of the information on machining program block. For example, when the information representing the type of alarm is "During execution of function A, function B cannot be executed," the alarm is issued because the function B is executed within the range where the function A is executed. Therefore, a correction method for removing the block that executes the function B from the range within which the function A is executed is employed (for example, the block that executes the function B is moved out of the range within which the function A is executed, the block that executes the function B is deleted, or the function A is temporarily terminated before the function B is executed and the function A is resumed after the function B is executed). The program proposing section 140 creates at least one set of correction patch data that can solve the cause of an alarm and proposes the created correction patch data.

For example, some examples of the correction patch data created by the program proposing section 140 to solve the alarm in the first example of the alarm cause data shown in FIG. 5 will be presented below.

Correction patch data A1: Move the block having the block number j to the position immediately before the block having the block number i.

Correction patch data A2: Move the block having the block number j to the position immediately after the block having the block number k.

Correction patch data A3: Delete the block having the block number j.

Correction patch data A4: Insert a block that terminates the nano-smoothing function in the position immediately before the block having the block number j, and insert a block that resumes the nano-smoothing function in the position immediately after the block having the block number j.

Some examples of the correction patch data created by the program proposing section 140 to solve the alarm in the second example of the alarm cause data shown in FIG. 5 will be presented below.

Correction patch data B1: Move the block having the block number j to the position immediately before the block having the block number i, move the block having the block number l to the position immediately after the block having the block number m, and further move the block having the block number k to the position immediately before the moved block having the block number j.

Correction patch data B2: Move the block having the block number j to the position immediately before the block having the block number i, move the block having the block number l to the position immediately after the block having the block number m, and further move the block having the block number k to the position immediately after the moved block having the block number l.

Correction patch data B3: Delete the blocks having the block numbers j, k, and l.

Correction patch data B4: Delete the blocks having the block numbers j and l.

Correction patch data B5: Move the block having the block number j to the position immediately before the block having the block number i, move the block having the block number l to the position immediately after the block having the block number m, and further delete the block having the block number k.

Correction patch data B6: Insert a block that terminates the circular interpolation function in the position immediately before the block having the block number j, and insert a block that resumes the circular interpolation function in the position immediately after the block having the block number j. Further, insert the block that terminates the circular interpolation function in the position immediately before the block having the block number l, and insert the block that resumes the circular interpolation function in the position immediately after the block having the block number l. Further, move the block having the block number k to the position immediately before the block j.

Correction patch data B7: Insert the block that terminates the circular interpolation function in the position immediately before the block having the block number j, and insert the block that resumes the circular interpolation function in the position immediately after the block having the block number j. Further, insert the block that terminates the circular interpolation function in the position immediately before the block having the block number l, and insert the block that resumes the circular interpolation function in the position immediately after the block having the block number l. Further, move the block having the block number k to the position immediately after the block l.

Further, to solve the alarm in the third example of the alarm cause data shown in FIG. 5, the program proposing section 140 creates the following correction patch data:

Correction patch data C1: Delete the block having the block number j.

The correction patch data presented above is an example, and any correction patch data that can solve the alarms may be created.

After the operator operates the input device to approve proposal patch data among the proposal patch data sets displayed on the CRT/MDI unit 70 (not shown), the program applying section 150 reads the approved proposal patch data from the proposal patch data storage section 230 and applies a correction method identified by the read proposal patch data to the machining program 200 to create a corrected machining program 200.

The thus configured numerical controller can automatically correct the machining program with no operator's own effort to analyze and correct the machining program but only by approval of proposal patch data proposed by the numerical controller.

The embodiment of the present invention has been described above, but the present invention is not limited only to the exemplary embodiment described above and can be implemented in a variety of other aspects with appropriate changes made to the embodiment.

For example, in the embodiment described above, as an example of the mismatch criterion information stored in the mismatch criterion information storage section 210, the inter-function mismatch table 211 and the environmental mismatch table 212 are presented, but the mismatch criterion information is not necessarily provided in the form of a table. The mismatch criterion information may instead be information in any form that allows an inter-function mismatch and a mismatch relating to execution environment to be defined as appropriate.

The invention claimed is:

1. A numerical controller that controls a machine based on a machining program, the numerical controller comprising:
   a mismatch criterion information storage section that stores mismatch criterion information that serves as criteria used to determine a block that causes an alarm to be issued when the machining program is executed;
   a program analyzing section that sequentially reads blocks contained in the machining program, analyzes the read blocks to identify the block that causes the alarm based on the mismatch criterion information stored in the mismatch criterion information storage section, and generates alarm cause data;
   a program proposing section that generates, based on the alarm cause data, at least one set of proposal patch data for correcting the machining program in such a way that the cause of the alarm is solved; and
   a program applying section that generates a corrected machining program that is the machining program to which the proposal patch data is applied.

2. The numerical controller according to claim 1,
   wherein the alarm cause data contains information representing a type of alarm and information on a machining program block relating to the alarm, and
   the program proposing section determines a method for correcting the machining program based on the information representing a type of alarm and further determines a location where the machining program is corrected based on the information on a machining program block relating to the alarm.

3. The numerical controller according to claim 1,
   wherein the program proposing section displays a screen that allows selection of any of the proposal patch data sets on a display section provided in the numerical controller, and
   the program applying section applies the proposal patch data selected on the selection screen to the machining program.

* * * * *